(12) United States Patent
Mochizuki

(10) Patent No.: US 6,405,676 B1
(45) Date of Patent: Jun. 18, 2002

(54) DISCHARGED URINE OR OTHER WASTE FLUIDS PROCESSING MATERIAL FOR ANIMALS

(75) Inventor: Shotaro Mochizuki, Shizuoka-ken (JP)

(73) Assignee: Peparlet Co., Ltd., Shizuoka-ken (JP)

( * ) Notice: Subject to any disclaimer, the term of this patent is extended or adjusted under 35 U.S.C. 154(b) by 0 days.

(21) Appl. No.: 09/564,852

(22) Filed: May 4, 2000

(30) Foreign Application Priority Data

Oct. 21, 1999 (JP) .............................. 11-299808

(51) Int. Cl.[7] .................... A01K 1/015; D21F 11/16
(52) U.S. Cl. .................. 119/171; 119/172; 428/222; 162/111
(58) Field of Search ................. 119/171, 172, 119/28.5; 428/221, 222, 364, 365, 369, 371

(56) References Cited

U.S. PATENT DOCUMENTS 4,100,017 A * 7/1978 Flautt, Jr. ............... 162/111
4,619,862 A * 10/1986 Sokolowski et al. ........ 428/221
5,630,377 A * 5/1997 Kumlin ..................... 119/172
5,698,293 A   12/1997 Nordlund et al.
5,786,056 A * 7/1998 Komine et al. ............. 428/43
5,964,188 A   10/1999 Hetman

FOREIGN PATENT DOCUMENTS

| GB | 2 261 586 | 5/1993 |
| JP | 54-24945 | 8/1979 |
| WO | 97/05769 | 2/1997 |

* cited by examiner

*Primary Examiner*—Yvonne R. Abbott
(74) *Attorney, Agent, or Firm*—Wenderoth, Lind & Ponack, L.L.P.

(57) ABSTRACT

A discharged urine or other waste fluids processing material for animals is fabricated of a short twisted paper rod obtained by cutting a twisted string into short pieces which twisted string is formed by twisting a strip of paper. The short twisted paper rod has such a paper layer structure that a fiber thereof is oriented from one end cutting plane thereof towards the other end cutting plane, and owing to the paper layer structure, the discharged urine or other waste fluids are allowed to permeate into the short twisted paper rod from the cutting planes.

6 Claims, 3 Drawing Sheets

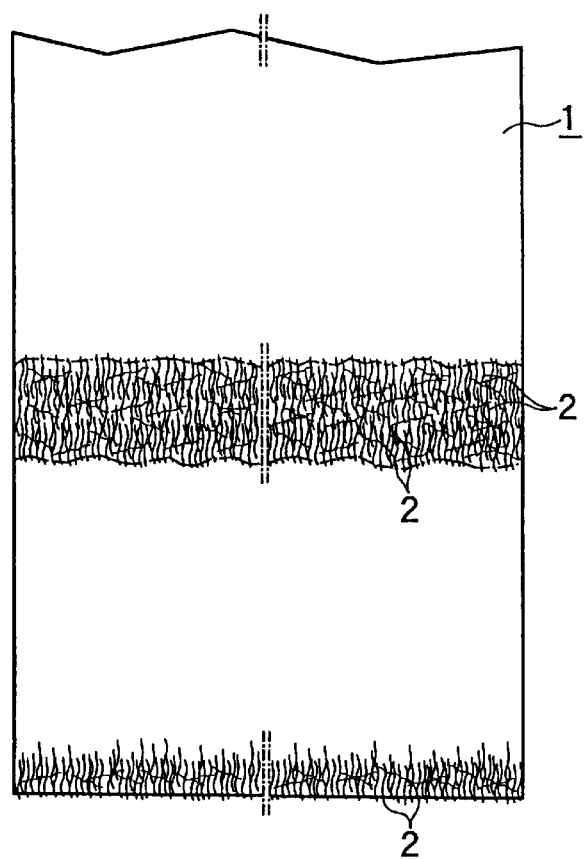
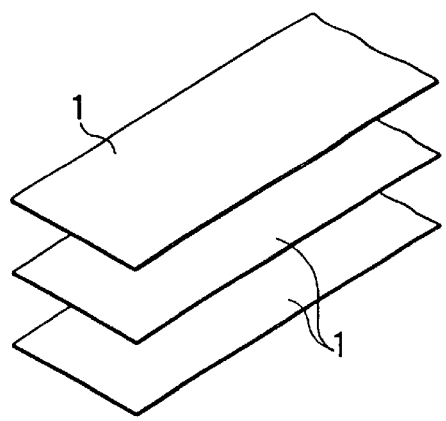
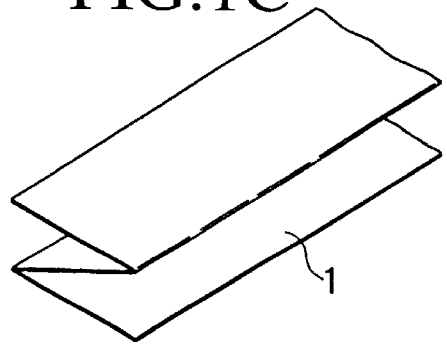
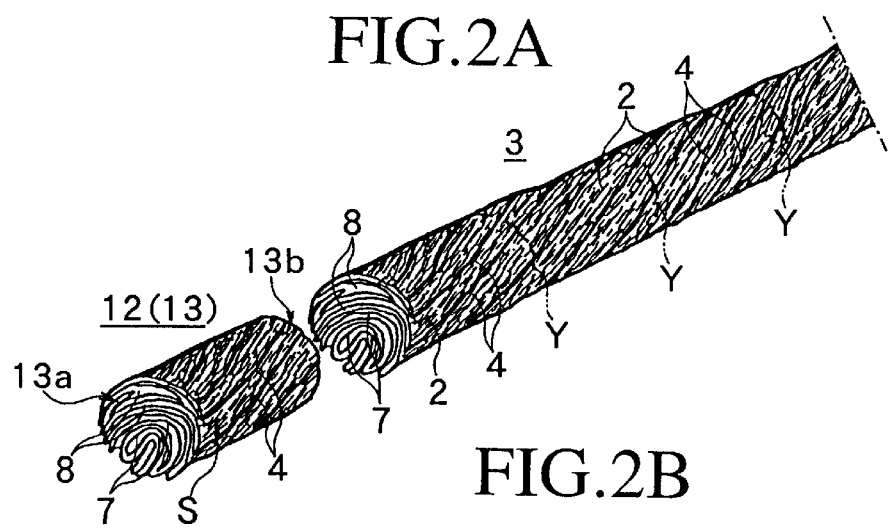
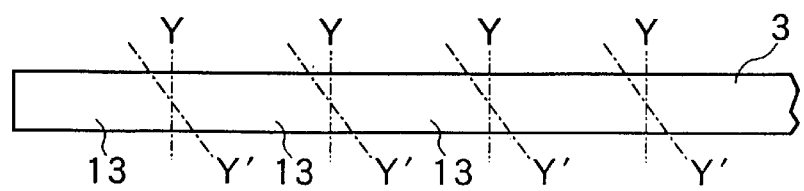

DISCHARGED URINE OR OTHER WASTE FLUIDS PROCESSING MATERIAL FOR ANIMALS

BACKGROUND OF THE INVENTION

1. Field of the Invention

This invention relates to a discharged urine or other waste fluids processing material for pet animals such as cats and household dogs, burrowing animals used in biological and/or scientific experiments, or the like.

2. Related Art

Japanese Patent Publication No. Sho 54-24945 discloses a discharged urine or other waste fluids processing material for animals, in which paper is cut into a strip of paper having an appropriate narrow width, the strip of paper is then twisted to form a twisted paper string and then, the twisted paper string is cut into a short twisted paper rod having a short length of about 2 to 10 mm.

When in use, a large quantity of the discharged urine or other waste fluids processing material is laid in a tray for animal use or the like so as to allow discharged urine or other waste-fluids to permeate therein under the effect of its water retentive function end water absorptive function. The processing material with urine, etc. permeated therein is removed from the tray and discarded into a toilet and a new processing material is laid in the tray for replenishment.

SUMMARY OF THE INVENTION

It is an object of the present invention to provide a discharged urine or other waste fluids processing material for pet animals which exhibits significantly improved urine permeating properties (water absorptive function and water retentive function).

From one aspect of the present invention, there is essentially provided in order to achieve the above object a discharged urine or other waste fluids processing material for animals fabricated of a short twisted paper rod obtained by cutting a twisted string into short pieces which twisted string is formed by twisting a strip of paper, wherein the short twisted paper rod has such a paper layer structure that a fiber thereof is oriented from one end cutting plane thereof towards the other end cutting plane, and owing to the paper layer structure, the discharged urine or other waste fluids are allowed to permeate into the short twisted paper rod from the cutting planes.

The paper layer structure significantly enhances the capillary action in the orientating direction of the fiber, that is to say, the capillary action (urine permeating action) from one end cutting plane of the short twisted paper rod to the other end cutting plane, thereby enhancing the effect for processing discharged urine and other waste fluids.

From another aspect of the present invention, there is also provided a discharged urine or other waste fluids processing material for animals fabricated of a short twisted paper rod obtained by cutting a twisted string into short pieces which twisted string is formed by twisting a strip of paper, wherein the short twisted paper rod has twisted pleats from one end cutting plane thereof towards the other end cutting plane and a coarse void formed between the adjacent twisted pleats by untwisting.

After the short paper twisted rod is twisted, it is untwisted to provide both the twisted form and the coarse void(s). This feature together with the paper layer structure offers an extensively improved urine permeating effect. Also, the coarse void enhances the cushioning effect and the heat retaining effect.

A twisting angle of the short twisted paper rod is preferably set to less than 180 degrees per 1 cm.

By doing so, the degree of the coarse void between the adjacent twisted pleats is increased. In addition, water retentive function within the coarse void and the urine permeating function which is exhibited thereafter are enhanced.

In one preferred embodiment of the present invention, the short twisted paper rod has a generally elongated elliptical configuration in section.

Owing to this feature, the sitting stability of the short twisted paper rod is improved with respect to the laying plane (the rod is prevented from being rollingly moved). This makes it possible to fully lay the short twisted paper rods in a discharge tray in a more stable manner. In addition, a fluid receiving plane is enlarged.

The short twisted paper rod may contain bacteria for enhancing maceration of the short twisted paper rod.

When the discharged urine or other waste fluids are discarded in a toilet after use, the bacteria, in cooperation with both the paper layer structure and the pleats structure, enhances the maceration and decomposition of the fiber within a toilet, a service water supply piping or a water-purifying tub so that the load for processing is decreased in the processing facilities.

A more complete application of the present invention and many of its attendant advantages will be readily obtained as the same becomes better understood by reference to the following detailed description when considered in connection with the accompanying drawings.

BRIEF DESCRIPTION OF THE DRAWINGS

FIG. 1(A) is an enlarged plan view showing an essential portion of a strip of paper for forming a twisted string for forming a short and twisted-paper rod, and FIGS. 1(B) and 1(C) are perspective views showing a superimposed state of the strip(s) of paper;

FIG. 2(A) is an enlarged perspective view showing an essential portion of a short and twisted-paper rod and a twisted string which form a discharged urine or other waste fluids processing material, and FIG. 2(B) is a view for explaining a cut angle for cutting the twisted string into small pieces during the procedure for forming the short and twisted-paper rod;

DETAILED DESCRIPTION OF THE EMBODIMENT

Figure 3:
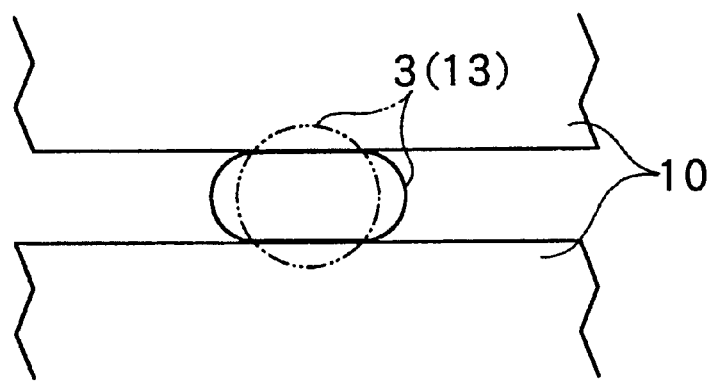
FIG. 3 is a front view for schematically showing one state of the essential portion in which the twisted string is compressed to form an elongated elliptical shape.

One embodiment of the present invention will now be described with reference to FIGS. 1 to 6.

Reference numeral 1 denotes a strip of paper. This strip of paper is produced by a known method in which pulp fibers are oriented in a running direction of wet paper during a paper-making process.

As shown in FIG. 1(A), the strip of paper 1 is a paper tape which is obtained as follows. First, a strip of paper having a wide width is prepared by such a method that a macerated pulp fiber 2 of a milk carton, for example is oriented in a longitudinal direction (running direction of the strip of paper) and then the wide strip of paper is vertically cut along the orientation direction of the fiber 2 so that paper tapes each having a narrow width are obtained. The strip of paper 1 thus obtained has the following paper layer structure. Owing to orientation of the fiber 2, the strip of paper 1 has a tensile strength in the longitudinal direction. In other words, it has a tear strength in a short direction. In addition, the strip of paper 1 is abundant in capillary action (moisture penetrating action) in the orientation direction of the fiber 2.

In summary, the strip of paper 1 has such properties that it is easily vertically torn due to vertical orientation of the fiber 2 (longitudinal orientation of the strip of paper 1) but has a lateral tear strength. Owing to this feature, the strip of paper 1 is prevented from being laterally torn when a twisted string 3 is formed.

It is arranged such that the strip of paper 1 has a basic weight in a range of from 30 to 40 g/m$^2$ and a length in the short direction, i.e., paper width, in a range of from 3 to 15 cm. The strip of paper 1 is then twisted in a range from 30 to 180 degrees per length of 1 cm, for example. By doing so, there can be obtained the twisted string 3. This twisted string 3 has such a paper layer structure that the pulp fiber 2 is oriented in the longitudinal direction from one end thereof towards the other end. That is to say, as shown in FIG. 2A, it has such a paper layer structure that the fiber 2 is oriented along a twisting line of the twisted string 3.

The twisted string 3 is formed of a piece of strip of paper 1. In the alternative, a plurality, for example, three of the strips of paper 1 are superimposed with respect to one another as shown in FIG. 1B or a strip of paper 1 having a wide width is folded in an overlapping fashion in the short direction along a folding line as shown in FIG. 1C and then twisted to form the twisted string 3. That is to say, a twisting structure obtained by superimposing a plurality of strips of paper 1 or folding a strip of paper 1 in an overlapping fashion is given to a short twisted paper rod 13, as later described, which is obtained from the twisted string 3. By doing so, the number of the coarse voids 8 is increased and the function thereof is enhanced.

A bacteria-containing layer 5 is formed on a surface of the strip of paper 1 by coating with the use of a spray gun, a roller or the like.

A comparatively smooth, glossy and dense layer 1' composed of an inorganic filler such as calcium carbonate, starch or the like is formed on a surface, which contacts a paper-making belt, a press roll and a drier roll, of the strip of paper 1 which has been paper-made and dried in a paper-making machine. As shown in FIGS. 5 and 6, the bacteria layer 5 for enhancing maceration of the fiber 2 is formed on the surface of the dense layer 1', namely, the surface of the strip of paper 1.

Also, an antibacterial agent-containing layer 6 is formed on the surface of the strip of paper 1. Also, a deodorant-containing layer 9 is formed on the surface of the strip of paper 1. In the alternative, an antibacterial agent and/or a deodorant contained-layer is formed on the surface of the strip of paper 1 together with a bacteria-containing layer.

Either a strip of paper 1 with a bacteria-containing layer 5, etc. formed thereon or a strip of paper 1 with no bacteria-containing layer 5, etc. formed thereon is prepared. And a twisted string 3 is formed using one of them.

The twisted string 3 is formed by twisting the strip of paper 1 through a known method, so that the twisted string 3 having a generally circular configuration in section is obtained. As shown in FIG. 2A, the twisted string 3 has a plurality of twisted pleats 7 and a plurality of coarse voids 8 each formed between the adjacent twisted pleats 7.

As shown in FIGS. 2A and 2B, the twisted sting 3 is cut into short pieces and by doing so, a plurality of short twisted paper rods 13 are formed.

Also, as shown in FIG. 3, the twisted string 3 is compressed by a pressure roll 10 so that it has a generally elongated elliptical configuration in section. The resultant twisted string 3 is cut into small pieces and by doing so, a plurality of short twisted paper rods 13 are formed.

Figure 4:
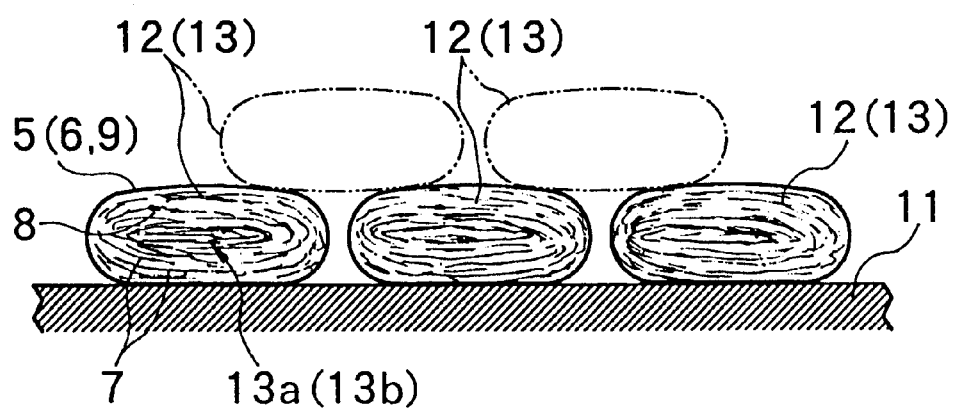
FIG. 4 is a sectional view for explaining one state in which the elongated elliptical short and twisted-paper rod, which forms the discharged urine or other waste fluids processing material, is laid in a discharging tray.

As shown in FIG. 4, the elongated elliptical short twisted paper rods 13 exhibit a favorable sitting stability with respect to the laying plane and can be laid in a stable manner and in a state prevented from being rollingly moved. In addition, the fluid receiving plane is enlarged with respect to discharged urine, etc. coming from above.

Each of the short twisted paper rods 13 has a plurality of pleats 7 and a plurality of coarse voids 8 each formed between the adjacent twisted pleats 7. Those coarse voids 8 are open at opposite end cutting planes 13a, 13b of the short twisted paper rod 13. Those coarse voids 8 have the function of a capillary tube which serves to guide entry of urine, etc. into the short twisted paper rod 13. Thus, this function of a capillary tube in cooperation with the paper layer structure S makes it possible to allow the urine, etc. to permeate into the rod 13 effectively.

As shown in one preferred embodiment in FIG. 2B, the twisted string 3 is cut into small pieces of about 10 to 50 mm along the cutting lines Y perpendicular to the axis of the twisted string 3. By doing so, the short twisted paper rods. 13 each serving as a discharged waste processing agent 12 are formed.

As another preferred embodiment, as shown in FIG. 2B, the short twisted string 3 is diagonally cut into small pieces of about 10 to 50 mm in length along the cutting lines Y obliquely intersecting the axis of the twisted string 3. By doing so, the short twisted paper rods 13 each serving as a discharged waste processing agent 12 are formed. By applying such a diagonal cutting, the area of the cutting plane of each short twisted paper rod 13 is enlarged and the function for permeation of the discharged waste, as later described, is more enhanced.

The short twisted paper rod 13 is twisted at a twisting angle of less than 180 degrees per 1 cm so that a plurality of pleats 7 and coarse voids 8 having the same twisting angle are formed. Owing to the twisting angle, the degree of void of the coarse void 8 between the adjacent pleats 8 is enhanced, and the water retaining function in the coarse cavity and the urine permeating function which is exhibited thereafter are enhanced.

More specifically, the twisted string 3 is formed by twisting, at 30 to 180 degrees per 1 cm in length, the strip of paper 1 which has been paper made by a known method in which the macerated pulp fiber is oriented in the running direction of a wet paper during the paper-making operation and then, the twisted string 3 is cut into small pieces of about 10 to 50 mm in length. Depending on the length of the cut out pieces, the short twisted rods 13 each having a twisting angle of about 30 to 900 degrees are formed. Thus, the twisted pleats 7 and the coarse voids 8 each having a twisting angle of less than 180 degrees per 1 cm are formed.

As shown in FIGS. 5 and 6, the short twisted paper rod 13 has such a paper layer structure S that the fiber 2 is oriented from the one end cutting plane 13a towards the other end cutting plane 13b. The cutting planes 13a, 13b of the short twisted paper rod 13 are not covered with the dense layer 1' and end faces of the fiber 2 are exposed.

Figure 5A:
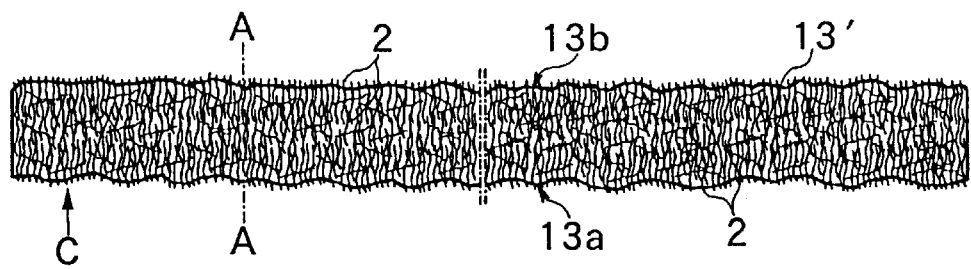
FIG. 5(A) is a plan view of a developed paper of the short and twisted-paper rod and FIG. 5(B) is an enlarged sectional view taken on line A—A of FIG. 5(A)
Figure 5B:
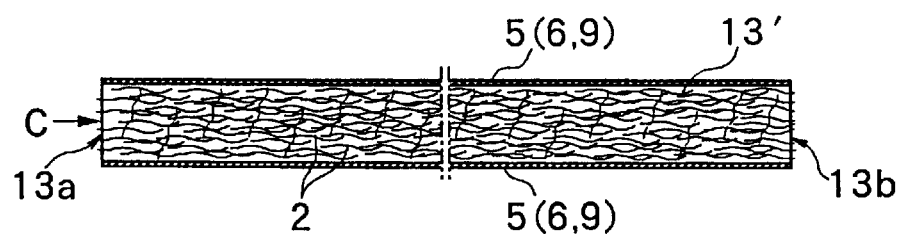
Figure 6:
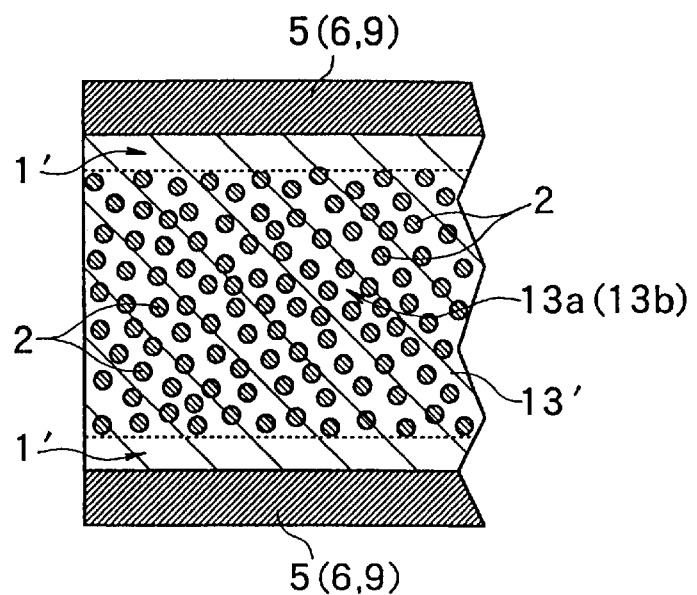
FIG. 6 is an enlarged sectional view of an essential portion, showing a cutting plane of the developed paper of the short and twisted-paper rod when viewed in a direction as indicated by arrows C of FIGS. 5(A) and 5(B).

FIG. 5A is a plan view of a developed paper 13' which forms the short twisted paper rod 13 and FIG. 13B is a sectional view taken on line A—A (in the short direction) of the FIG. 5A and schematically showing the orientating direction of the fiber 2 and the bacteria-containing layer 5. FIG. 6 is an enlarged sectional view of an arrangement state of the cutting plane of the short twisted paper rod 13, namely, the cutting plane of the developed paper 13' which forms the rod 13 when viewed in the direction of its front (viewed as indicated by the arrows C of FIG. 5) and the bacteria-containing layer 5.

Owing to this paper layer structure S, the capillary action in the orienting direction of the fiber 2, namely the capillary action (urine permeating action) from one end cutting plane 13a of the short twisted paper rod 13 towards the other end cutting plane 13b is remarkably enhanced so that the urine permeating effect is enhanced.

In other words, the fiber 2 is oriented from the one end cutting plane 13a of the short twisted paper rod 13 towards the other end cutting plane 13b along the twisting lines 4, and the end faces of the fibers 2 are exposed at the cutting planes 13a, 13b, so that urine, etc. are longitudinally permeated into the rod 13 under the effect of capillary action of the fiber 2 from the respective cutting planes 13a, 13b.

The short twisted paper rod 13 is formed by untwisting the twisted string 3 after it is twisted, and then cut into small pieces. The short twisted paper rod 13 thus obtained has the untwisted structure which the twisted string 3 exhibits and the coarse voids 8 caused by the untwisting. This makes it possible to retain the twisting habit of the short twisted paper rod 13, thereby enabling the twisted form to be retained favorably.

As another example, the short twisted paper rod 13 contains bacteria for enhancing maceration of the fiber 2.

For example, the bacteria-containing layer 5 is formed on the strip of paper 1 or the antibacterial agent-containing layer and/or the deodorant-containing layer is formed on the surface of the strip of paper 1 together with the bacteria-containing layer as previously described, thereby forming the twisted string 3. The twisted string 3 thus obtained is cut into small pieces to form the short twisted paper rods 13 containing bacteria. When contacted with the urine, etc. of animals and the flushing water in the toilet, the bacteria in cooperation with the twisted structure (twisted pleats structure and coarse void structure) is activated thereby enhancing the maceration and decomposition of the fiber 2.

The bacteria-containing layer 5 may contain a decomposing ferment such as organic nutrition promoting agent, amylase or the like in addition to bacteria. By doing so, maceration and decomposition of the fiber 2 are facilitated due to multiplication effect thereof The antibacterial agent and deodorant-containing layers 6, 9 serve to absorptively remove the malodors coming from the urine, etc. and provide an antibacterial treatment thereto so that the material with the urine, etc., permeated therein is kept sanitarily. It is also accepted that the malodors are deodorized by applying an aromatic substance having a strong fragrance.

The discharged urine or other waste fluids processing material 12 fabricated of the short twisted paper rod 13 are abundant in cushioning and heat retaining properties owing to a provision of the twisted pleats 7 and the coarse voids 8. The present invention includes those laying goods for bedding which have the discharged urine processing function utilizing the features of the present invention just mentioned.

According to the present invention, when a conventional discharged urine or other waste fluids processing material for animals composed of short twisted paper rods which are obtained by cutting a twisted string into small pieces, is formed, the short twisted paper rods are provided with an extensively enhanced urine permeating function (water absorptive function and water retentive function). Thus the discharged urine or other waste fluids processing material for animals according to the present inventi

What is claimed is:

1. A discharged urine or other waste fluids processing material for animals, fabricated of a short twisted paper rod obtained by cutting a twisted string into short pieces which twisted string is formed by twisting a strip of paper, wherein said short twisted paper rod has such a paper layer structure that a fiber thereof is oriented from one end cutting plane thereof towards the other end cutting plane, and owing to the paper layer structure, the discharged urine or other waste fluids are allowed to permeate into said short twisted paper rod from said cutting planes, wherein a twisting angle of said short twisted paper rod is set to less than 180 degrees per 1 cm.

2. A discharged urine or other waste fluids processing material for animals according to claim 1, wherein said short twisted paper rod has a generally elongated elliptical configuration in section.

3. A discharged urine or other waste fluids processing material of animals according to claim 1, wherein said short twisted paper rod contains bacteria for enhancing maceration of said short twisted paper rod.

4. A discharged urine or other waste fluids processing material for animals, fabricated of a short twisted paper rod obtained by cutting a twisted string into short pieces which twisted string is formed by twisting a strip of paper, wherein said short twisted paper rod has such a paper layer structure that a fiber thereof is oriented from one end cutting plane thereof towards the other end cutting plane, and owing to the paper layer structure, the discharged urine or other. waste fluids are allowed to permeate into said short twisted paper rod from said cutting planes, wherein said short twisted paper rod contains bacteria for enhancing maceration of said short twisted paper rod.

5. A discharged urine or other waste fluids processing material for animals, fabricated of a short twisted paper rod obtained by cutting a twisted string into short pieces which twisted string is formed by twisting a strip of paper, wherein said short twisted paper rod has twisted pleats from one end cutting plane thereof towards the other end cutting plane and a coarse void formed between the adjacent twisted pleats by untwisting, wherein a twisting angle of said short twisted paper rod is set to less than 180 degrees per 1 cm.

6. A discharged urine or other waste fluids processing material for animals, fabricated of a short twisted paper rod obtained by cutting a twisted string into short pieces which twisted string is formed by twisting a strip of paper, wherein said short twisted paper rod has twisted pleats from one end cutting plane thereof towards the other end cutting plane and a coarse void formed between the adjacent twisted pleats by untwisting, wherein said short twisted paper rod contains bacteria for enhancing maceration of said short twisted paper rod.

* * * * *